Nov. 16, 1926.

J. LEDWINKA 1,607,262

ELECTRIC WELDING

Filed June 30, 1921

Witness
Walter M. Trout.

INVENTOR.
JOSEPH LEDWINKA.
BY
C. B. Desjardins
ATTORNEY

Patented Nov. 16, 1926.

1,607,262

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

ELECTRIC WELDING.

Application filed June 30, 1921. Serial No. 481,513.

This invention relates to improvements in electric welding and has to do, more particularly, with that sort of electric welding known as spot-welding.

Heretofore, considerable difficulty has been experienced in uniting metal pieces or sheets, which differ considerably in thickness, by means of a series of spot-welds. When this is tried, in accordance with methods known previously, the thinner piece of metal tends to wrinkle or buckle so that the work is unsatisfactory and considerable labor is necessary in order to remove these wrinkles from the sheet of metal.

The principal object of my invention is to provide a method for spot-welding together pieces of metal without the objectionable wrinkling or buckling which I have referred to.

Another object of my invention is to provide an improved joint or union between two pieces of metal.

Further objects, and objects relating to economies and details of operation, will definitely appear from the detailed description to follow. My invention is clearly defined and pointed out in the appended claims. One preferred embodiment of my invention is described in the specification and illustrated in the accompanying drawing, forming a part of this specification, in which:

In the drawings, similar reference numerals refer to similar parts throughout the several views, and the sectional view is taken looking in the direction of the arrow at the end of the section line.

In general, I carry out my invention by providing a series of depressions in one of the pieces to be united, applying the piece to be joined to it over said depressions and placing the overlapping pieces of metal between the electrodes of a spot-welding machine so that, when the machine is operated to press the electrodes against the pieces of metal, the metal of the one sheet or piece will be pressed in to the depression previously formed in the other piece and, simultaneously, a spot-weld will be formed in said depression uniting the pieces of metal. In practice, I have found it very desirable to form the depression in the thicker piece of metal and to force the metal of the thinner piece down into the depression by the action of the electrode of the spot-welding machine. To accomplish this expeditiously, I have found it to be a good plan to provide one of the electrodes with a concave seat in which the depression can rest and to provide the other electrode with a pointed end suitable for forcing the metal of the thinner sheet into the depression.

Figure 1:
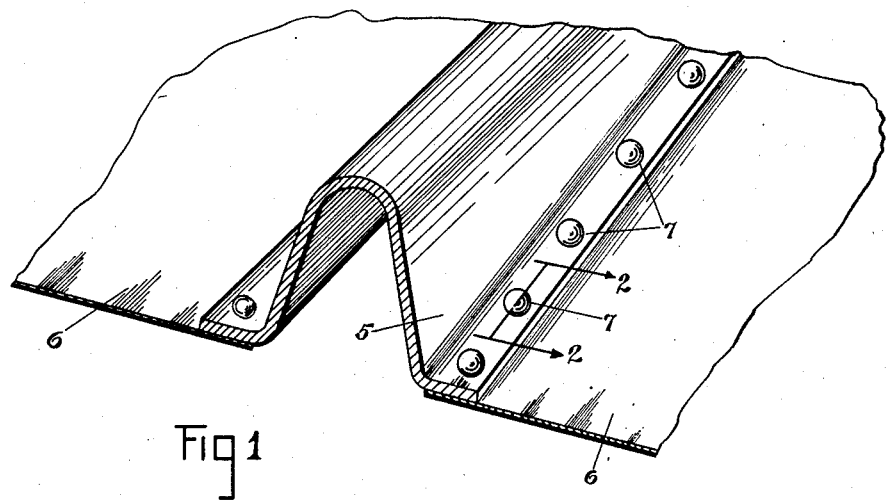
Fig. 1 is a perspective view of composite metal work comprising pieces of metal differing considerably in thickness and united in accordance with my invention.
Figure 2:
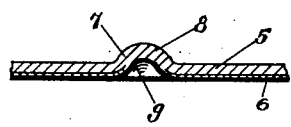
Fig. 2 is a sectional view on the line 2—2 of Fig. 1, taken through one of the welds.
Figure 3:
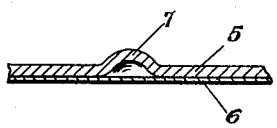
Fig. 3 is a similar view showing the relation of the pieces of metal prior to the formation of the weld.
Figure 4:
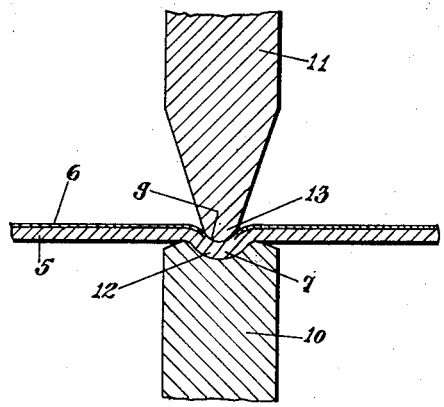
Fig. 4 is a sectional view showing the two pieces of metal between the electrodes of a spot-welding machine after the completion of the weld.

In Fig. 1 of the drawing, I have shown two relatively thin sheets of metal, 6, united to a reinforcing rib, 5, which is formed of considerably thicker metal, by means of my invention. In doing this I, first, press a series of hemispherical bosses or depressions, 7, in the flange or portion of the metallic member, 5, to which the edge portion of the sheet of metal, 6, is to be united. These depressions may very well be about the size and shape of a rivet head. The metallic member, 5, is then supported between the electrodes, 10 and 11, of an electric spot-welding machine, so that the convex surface of one of the bosses or depressions, 7, rests in the concave seat, 12, formed in the upper end of the electrode 10. The edge portion of the thinner sheet of metal, 6, which is to be united to the part, 5, is then inserted between the upper face of the member, 5, and the lower end of the electrode, 11. The spot-welding machine is operated, causing the electrode, 11, to approach the electrode, 10. The flow of current between the electrodes, through the pieces of metal inserted between them, causes the metal to fuse at the point where the electrodes engage, and the pressure with which the electrode, 11, bears upon the work, forces the metal of the thin piece or sheet, 6, down into the depression, 7, and, at the same time, forms a spot-weld, 8, in said depression, uniting the two pieces of metal at that point. In effect, this forms a depression, 9, in the sheet, 6, which nests within the depression, 7, and is joined to it by the spot-weld, 8. The end of electrode, 11, is pointed, as at 13, to facilitate the forming of the depression, 9.

The sheet of metal, 6, is joined to the metallic member, 5, by a series of welds, formed in the manner which I have described. I have found that, where the parts are united according to this method, there will be no wrinkling or buckling of the thinner piece of metal even though the two pieces united may differ considerably in thickness. I have also found that this makes a much stronger connection between the parts. I believe that the wrinkling or buckling of the thinner sheet, when connected to a thicker piece of metal by a series of ordinary spot-welds, is due to the unequal expansion of the pieces of different thickness under the influence of the heat generated by the welding operation and I believe that this wrinkling or buckling is avoided, in the method of my invention, because of the fact that the excess metal is forced down into the depression, 7, formed in the piece, 5, thus taking up a certain amount of excess metal which would otherwise cause the piece to wrinkle. The finished product presents an appearance which is very similar to that of two parts riveted together, as will appear from Fig. 1 of the drawing, and this method is useful in cases where it is desired to connect parts by spot-welding, and, at the same time, to simulate a riveted connection.

In practice, I have employed this method in joining together pieces of steel and have used copper electrodes having a resistivity considerably less than the metal pieces to be united. I do not wish to be restricted, however, to the uniting of pieces of steel, or to the use of copper electrodes, as I believe that my invention is applicable to the uniting of parts of other metal and that other materials may be available for use as electrodes.

I am aware that my invention is susceptible of considerable variation without departing from the spirit thereof and, therefore, I desire to claim the same broadly, as indicated by the appended claims.

Having thus described my invention, what I claim as new and useful and desire to secure by Letters Patent, is:

1. The process of uniting metal members of relatively differing thickness, which consists in first forming a depression in the surface of one of them only, and then displacing the metal of the other unit into the depression and simultaneously welding the two together at the base of the depression.

2. The process of uniting metal members, which consists in first forming a depression in one of said members, and then simultaneously preheating and deforming the metal of the other member and forcing the deformed portion of the same within said depression, and finally electrically welding the members together at a spot located within the depression.

3. The process of uniting metal members of relatively different thickness, which consists in first forming a depression in the thicker member, then preheating and deforming the metal of the thinner piece and forcing the same into said depression, and finally welding the members together by a weld located within said depression.

4. The process of uniting metal members of relatively different thickness, which consists in first forming a depression in the thicker member, then applying pressure to the thinner member at a point over the depression and simultaneously preheating a portion of the same and forcing the heated portion into the depression, and finally increasing the pressure and forming an electric spot weld at a point located within the depression.

5. The process of uniting two pieces of metal consisting in first forming a depression in one of said pieces, lapping the second piece over the depression, and applying, under pressure, welding electrodes to said pieces at the depression, thereby heating the metal of the one piece and deforming it to force it into the depression in the other, and, simultaneously, uniting the two pieces by a spot-weld located at a point in the depression.

6. The process of uniting two pieces of metal of relatively different thickness consisting in first forming a depression in the thicker piece, lapping the thinner piece only over the depression, and applying, under pressure, welding electrodes to said pieces at the depression, thereby preliminarily heating and initially forcing the metal of the thinner piece into the depression and ultimately uniting the two pieces by a spot-weld located at a point in the depression.

7. The process of uniting metal members, which consists in forming depressions in the surface of one of said members, superposing said members upon one another, deforming portions of the other member into said depressions, and electrically welding the members together at points within the depressions, both said pressing and welding operations being accomplished by the use of the same tool.

8. The process of uniting metal members of normally smooth surface, which consists in first forming depressions in one of said members, then disposing the other of said members over the depressions so formed, then applying pressure to said second mentioned member to deform and force portions thereof into the depressions and finally electrically welding the members together at points located within the depressions.

In testimony whereof, I affix my signature.

JOSEPH LEDWINKA.